July 17, 1956  T. L. HIBBARD  2,754,939
VENTILATING STRUCTURE FOR WHEEL BRAKES
Filed Sept. 21, 1953  2 Sheets-Sheet 1

*INVENTOR.*
THOMAS L. HIBBARD

BY

ATTORNEYS

July 17, 1956  T. L. HIBBARD  2,754,939
VENTILATING STRUCTURE FOR WHEEL BRAKES
Filed Sept. 21, 1953  2 Sheets-Sheet 2

INVENTOR.
THOMAS L. HIBBARD
BY
ATTORNEYS

2,754,939

VENTILATING STRUCTURE FOR WHEEL BRAKES

Thomas L. Hibbard, Birmingham, Mich., assignor to Kelsey-Hayes Wheel Company, Detroit, Mich., a corporation of Delaware Application September 21, 1953, Serial No. 381,287

7 Claims. (Cl. 188—264)

The invention relates to wheels and refers more particularly to motor vehicle wheels.

The invention has for one of its objects to provide an improved construction of vehicle wheel for securing flow of air to ventilate a brake drum associated with the wheel.

The invention has for another object to provide a wheel having air scoops constructed to effect, while the wheel is rotating, a strong air current through the wheel.

The invention has for a further object to provide improved air scoops which are designed for ready attachment to the wheel.

With these and other objects in view, the invention resides in the novel features of construction as more fully hereinafter set forth.

Figure 1:
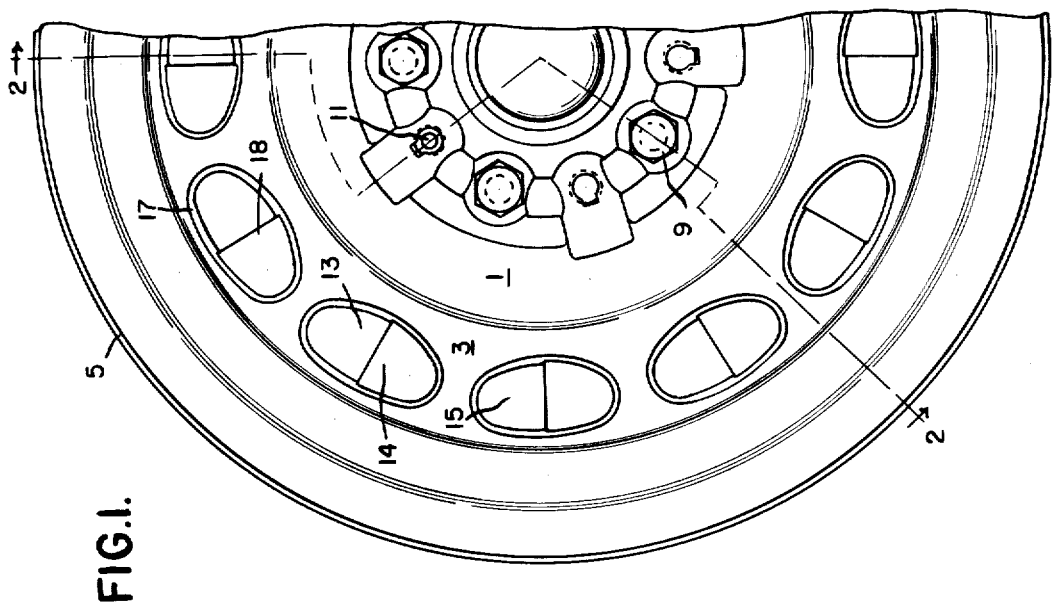
Figure 1 is an outboard elevation of a wheel embodying the invention.
Figure 2:
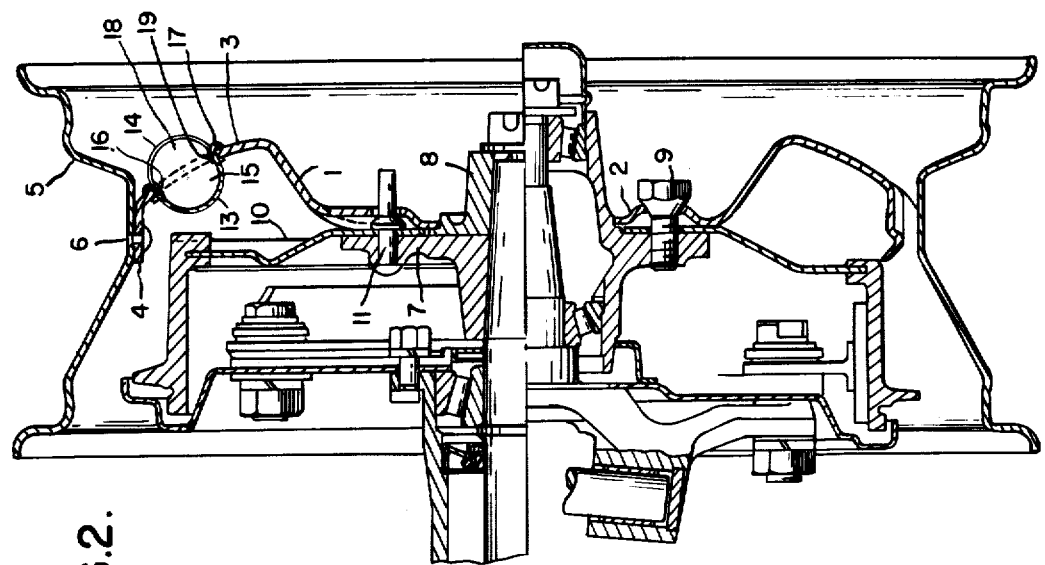
Figure 2 is a cross-section on the line 2—2 of Figure 1 also showing the wheel hub and brake drum.
Figure 4:
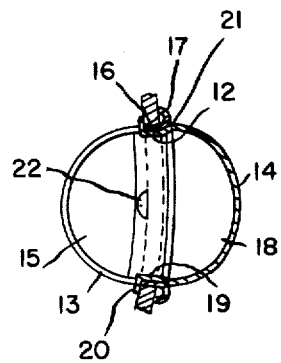
Figure 3:
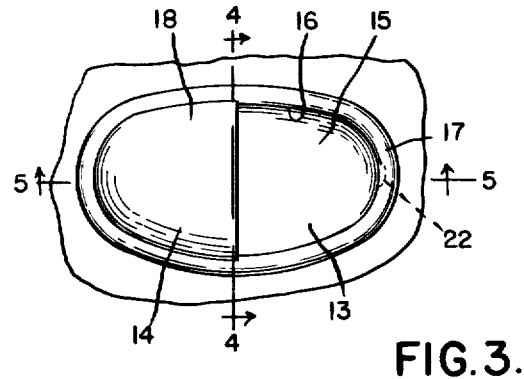
Figure 3 is an enlarged view of a portion of Figure 1.
Figure 5:
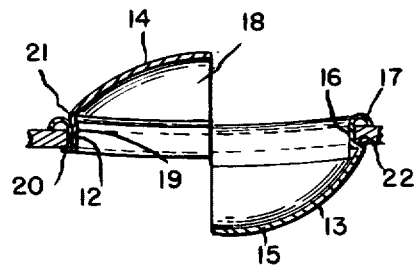
Figure 6:
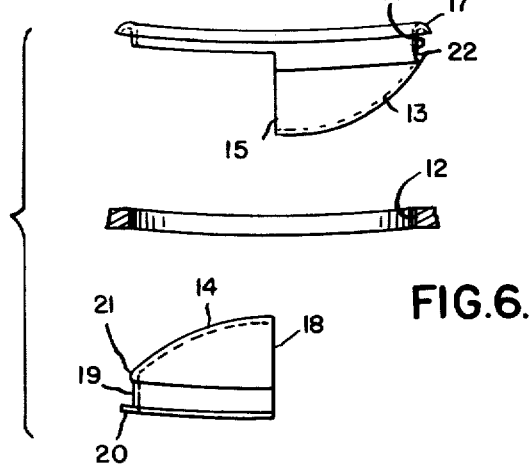

Figures 4 and 5 are cross sections on the line 4—4 and 5—5 of Figure 3;

Figure 6 is a view showing the air scoops separated.

The wheel is a motor vehicle wheel having the disk 1 provided with the mounting or bolting-on portion 2, the web portion 3, and the peripheral flange 4 to which the tire carrying rim 5 is secured by suitable means, such as the rivets 6. The mounting or bolting-on portion 2 is adapted to be detachably secured to the fixed radial flange 7 of the wheel hub 8 by suitable means, such as the bolts 9. 10 is the brake drum at the inboard side of the wheel disk and permanently secured to the fixed radial flange 7 by means of the rivets 11, one of which is formed with a pilot to assist in mounting of the disk.

For the purpose of ventilating the brake drum, the web portion 3 of the wheel disk is formed with the annular series of holes 12 and air scoops are secured to the web portion to secure flow of air through the holes when the wheel is rotating. The air scoops are arranged in pairs with a pair for each hole and each pair comprises the inboard scoop 13 and the outboard scoop 14. The inboard scoop is formed of the louver 15 and the integral annular endless rim 16 which terminates in the return-bent flange 17. The rim is shaped to fit the border of a ventilating hole 12. The outboard scoop 14 is formed of the louver 18 and the integral arcuate rim 19 terminating in the radial flange 20, the arcuate rim being shaped to fit within the adjacent portion of the annular rim 16. Furthermore, the outboard scoop is provided with the arcuate shoulder 21 at the junction of the louver and the arcuate rim to abut the adjacent portion of the flange 17 of the inboard air scoop.

The air scoops are assembled with respect to the disk and each other to locate their louvers at opposite sides of the disk and over different halves of the ventilating hole and to open in opposite directions peripherally of the wheel. Also, when the air scoops are assembled with the disk, the terminal flange 17 of the inboard air scoop abuts the outboard side of the disk while the terminal flange 20 of the outboard scoop abuts the inboard side of the disk. To further assist in securing the air scoops in place, the inboard air scoop is provided with a local shoulder catch abutting the inboard side of the disk, this shoulder catch being formed by the projection 22 at the junction of the louver 15 and the rim 16 substantially midway of the periphery of the louver.

To assemble the pair of air scoops with the wheel disk, the inboard air scoop 13 is first pressed in an inboard direction through a ventilating hole 12 to move the terminal flange 17 against the outboard side of the web portion of the disk. Then, the outboard air scoop 14 is moved bodily angularly in an outboard direction to force its terminal flange 20 against the inboard side of the web portion of the disk at which time its arcuate rim is telescoped within the adjacent portion of the rim 16 and the arcuate shoulder 21 abuts the adjacent portion of the terminal flange 17.

The air scoops are formed of resilient material, preferably sheet steel, so that during their assembly they may be sprung into place and then allowed to snap into locking engagement.

In operation, effective flow of air is secured while the wheel is rotating by reason of the louvers at one side of the wheel disk picking up air and creating a pressure and the louvers at the other side creating a vacuum.

What I claim as my invention is:

1. A vehicle wheel for ventilating a brake drum comprising a wheel disk having a bolting-on portion and holes through said wheel disk beyond the bolting-on portion, and air scoops detachably secured to said disk having louvers at one side of said disk and integral annular rims extending through the holes and formed with flanges abutting the side of said disk opposite said louvers and also having louvers at the last mentioned side of said disk and integral arcuate rims extending through said first mentioned rims and formed with flanges abutting the side of said disk opposite said first mentioned flanges and also with shoulders abutting said first mentioned flanges, the louvers at the opposite sides of said disk opening in opposite directions peripherally of the wheel.

2. A vehicle wheel for ventilating a brake drum comprising a wheel disk having a mounting portion and holes through said wheel disk beyond the mounting portion, and air scoops secured to said disk having louvers at opposite sides of said disk arranged in pairs with the louvers of each pair extending over different portions of a hole and opening in opposite directions peripherally of the wheel and forming a passage through the hole for air, the flow of air through said passages being obtained while the wheel is rotating by reason of the louvers opening in one direction creating a pressure by picking up air and the louvers opening in the other direction creating a vacuum.

3. A vehicle wheel comprising a wheel disk having a hole therethrough, and air scoops secured to said disk having louvers at opposite sides of said disk extending over different portions of the hole and opening in opposite directions peripherally of the wheel, said scoops also having rims integral with said louvers and detachably secured to said disk and each other, said louvers and rims forming a passage for air, the flow of air through said passage being obtained while the wheel is rotating by reason of one of said louvers creating a pressure by picking up air and the other louver creating a vacuum.

4. In a ventilating vehicle wheel, a disk member having holes therethrough and louvers at opposite sides of said disk member arranged in pairs with the louvers of each pair extending over different portions of a hole and opening in opposite directions peripherally of the wheel and forming a passage through the hole for air, the flow of air through said passages being obtained while the wheel is rotating by reason of the louvers opening in one direction creating a pressure by picking up air and the louvers opening in the other direction creating a vacuum.

5. A vehicle wheel comprising a wheel disk having a hole therethrough, and means for creating flow of air through the hole comprising louvers at opposite sides of the disk extending over different portions of the hole and opening in opposite directions peripherally of the wheel, the flow of air through said hole being obtained while the wheel is rotating by reason of one of said louvers creating pressure by picking up air and the other of the louvers creating vacuum.

6. A vehicle wheel comprising a wheel disk having a hole therethrough, and means for creating a flow of air through the hole comprising louvers associated with the hole and opening in opposite directions peripherally of the wheel, the flow of air through said hole being obtained while the wheel is rotating by reason of one of said louvers creating pressure by picking up air and the other louver creating vacuum.

7. A vehicle wheel for ventilating a brake part comprising a wheel body having a passage therethrough for air, and means for creating flow of air through the passage comprising a pair of louvers associated with the passage, the flow of air through said passage being obtained while the wheel is rotating by reason of one of the louvers being disposed to create pressure by picking up air and the other louver being disposed to create a vacuum.

References Cited in the file of this patent

UNITED STATES PATENTS

| D. 103,682 | Kerr | Mar. 23, 1937 |
| 1,159,502 | King et al. | Nov. 9, 1915 |
| 1,665,437 | Booth | Apr. 10, 1928 |
| 2,248,707 | Horn | July 8, 1941 |
| 2,251,539 | Ash | Aug. 5, 1941 |

FOREIGN PATENTS

| 557,477 | Germany | Aug. 27, 1932 |

Notice of Adverse Decision in Interference

In Interference No. 88,374 involving Patent No. 2,754,939, T. L. Hibbard, Ventilating structure for wheel brakes, final judgment adverse to the patentee was rendered March 25, 1957, as to claims 6 and 7.

[*Official Gazette May 21, 1957.*]